(12) United States Patent
Fox et al.

(10) Patent No.: US 7,821,413 B2
(45) Date of Patent: Oct. 26, 2010

(54) ENHANCED AC IMMUNITY IN GROUND FAULT DETECTION

(75) Inventors: William J. Fox, Raleigh, NC (US); Michael Carter, Clayton, NC (US)

(73) Assignee: ADC DSL Systems, Inc., Morristown, NJ (US)

( * ) Notice: Subject to any disclaimer, the term of this patent is extended or adjusted under 35 U.S.C. 154(b) by 101 days.

(21) Appl. No.: 12/239,944

(22) Filed: Sep. 29, 2008

(65) Prior Publication Data

US 2009/0015434 A1    Jan. 15, 2009

Related U.S. Application Data

(62) Division of application No. 11/376,898, filed on Mar. 16, 2006, now Pat. No. 7,443,308.

(51) Int. Cl.
G08B 21/00 (2006.01)
G01R 31/08 (2006.01)
H02H 3/00 (2006.01)
H02H 3/20 (2006.01)
H02H 9/04 (2006.01)

(52) U.S. Cl. ........................ 340/649; 324/522; 324/525; 361/42; 361/91.2

(58) Field of Classification Search ................. 340/649, 340/650, 635, 651, 652; 361/6, 91.2, 42, 361/43, 56; 714/25
See application file for complete search history.

(56) References Cited

U.S. PATENT DOCUMENTS

| | | | | |
|---|---|---|---|---|
| 4,389,640 A | * | 6/1983 | Dawdy | 340/664 |
| 4,417,202 A | * | 11/1983 | Pascoe | 324/509 |
| 4,647,920 A | * | 3/1987 | Corso | 340/650 |
| 4,739,274 A | * | 4/1988 | Kimball et al. | 324/529 |
| 4,849,846 A | * | 7/1989 | Hung et al. | 361/56 |
| 5,153,808 A | | 10/1992 | Juntunen et al. | |
| 5,586,057 A | | 12/1996 | Patel | |
| 5,982,136 A | * | 11/1999 | Pelly | 318/801 |
| 6,002,338 A | | 12/1999 | Pavlov et al. | |
| 6,121,886 A | | 9/2000 | Andersen | |
| 6,157,308 A | * | 12/2000 | Byers | 340/635 |
| 6,473,281 B1 | * | 10/2002 | Kornblit | 361/42 |
| 2006/0056118 A1 | | 3/2006 | Huczko et al. | |
| 2007/0085693 A1 | | 4/2007 | Feight | |
| 2008/0174922 A1 | * | 7/2008 | Kimbrough | 361/42 |

* cited by examiner

*Primary Examiner*—Jennifer Mehmood
(74) *Attorney, Agent, or Firm*—Fogg & Powers LLC

(57) ABSTRACT

A method for reducing the occurrence of false ground fault detections in a central office terminal is provided. The method includes generating a no-fault signal when no ground current is detected, delaying generation of a fault signal when ground current is detected at least for the duration of an expected pulse in AC induced signal, and when the ground current persists for a sufficient period, generating a signal indicating a fault condition.

15 Claims, 3 Drawing Sheets

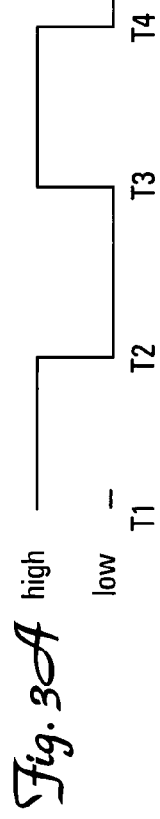
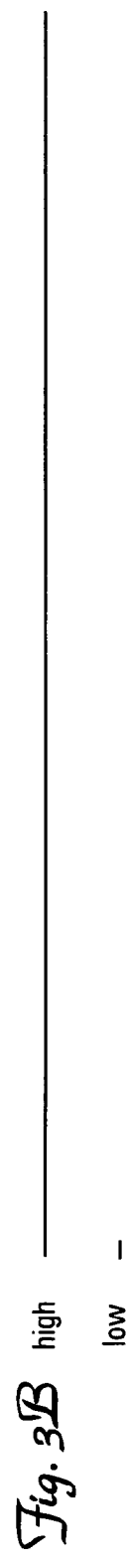
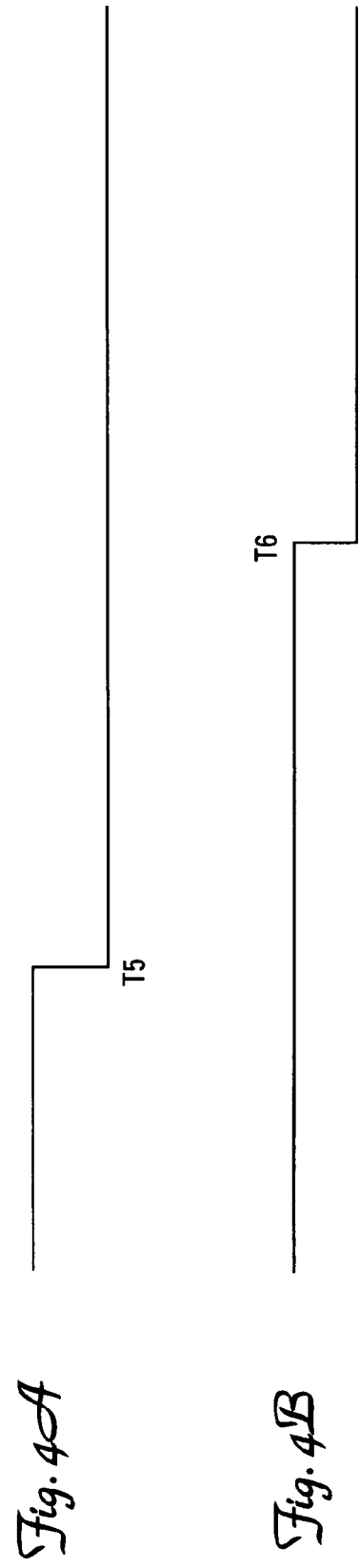

ENHANCED AC IMMUNITY IN GROUND FAULT DETECTION

CROSS REFERENCES TO RELATED APPLICATIONS

This application is a divisional of application Ser. No. 11/376,898 filed on Mar. 16, 2006, entitled "ENHANCED AC IMMUNITY IN GROUND FAULT DETECTION" U.S. Pat. No. 7,443,308 issued on Oct. 28, 2008 which is hereby incorporated herein by reference.

BACKGROUND

In many telecommunications applications, repeaters and other electronic devices are housed in remote units scattered throughout a geographical region in the vicinity of a central office. In one example, a remote unit communicates with the central office and also receives power from the central office through the same cable or other communication medium. This cable is also referred to as a "span cable," "plant," or "cable plant." An example of a span cable includes a set of twisted-pair conductors over which telecommunications data is transferred between the central office and the remote units, and over which DC power is supplied by the central office to the remote unit.

The remote unit typically utilizes the power received from the central office over the span cable to power one or more electronic devices within the remote unit. The power delivered via a span cable is often susceptible to disturbances (such as faults, voltage spikes and surges) caused by environmental factors such as lighting and nearby electrostatic discharges. Left unmitigated, such power disturbances can interrupt telecommunications operations and permanently damage equipment.

Many electrical protection and personnel safety systems have been developed to detect these disturbances. One such system is generically referred to as ground fault detection system. With ground fault detection, the system looks for excessive current flowing to ground. When such current is detected, the ground fault detection system takes appropriate action such as shutting down the power supply that transmits power over the span cable.

AC power lines are often located within the vicinity of the span cable or plant of the telecommunications network. The signals on the AC power lines can adversely affect signals on the span cable through a phenomenon known as "AC induction." With AC induction, an AC signal from the power lines or other source of AC power is induced onto the copper plant. When the electronic devices of the network are separated by a large distance, the plant is more susceptible to AC induction.

AC voltages typically are induced longitudinally upon span cables which cause currents to flow through the longitudinal noise filter circuits to ground at both the Central Office Terminal (COT) and Remote Terminal (RT) equipment. The earth ground maintained between the COT and RT installation completes the circuit, allowing the induced voltage to maintain current flow in the communication systems grounding path. The longitudinal noise filter circuits present a relatively high impedance to ground at the AC power line frequencies to avoid large currents from flowing in the filters ground path, as would be the case in a direct contact of an AC power line with the span cable (known as a power cross event). The ground fault detection circuit is designed to monitor the level of DC current flowing in the grounding system as the result of leakage currents to ground along the cable span and equipment. AC induction currents are imposed on the DC leakage currents and can look like a ground fault to the ground fault detection circuit during the half of the AC cycle which is additive to the DC current. Thus, the AC induced signal could trip the ground fault detection circuit causing the power supply to be inadvertently turned off. This could be compensated for with a large filter, e.g., a large capacitor, in the ground fault detection circuit to filter out the AC signal. However, the filter would have to be prohibitively large and expensive due to the large voltages involved. Further, if a large capacitor is incorporated into the ground fault detection circuit, any alternating longitudinal voltage on the span would be exposed to a low (longitudinal) impedance to ground. If the power lines came into direct contact with the cable plant of the telecommunications network, the power lines would be shorted to ground through the network device. Software filters have also been used to attempt to address this phenomenon. However, the effectiveness of software filters tend to roll off at higher frequencies. It has been discovered that some of the most relevant frequencies for AC immunity are harmonics that fall outside the effective range of traditional software filters.

Therefore, there is a need in the art for enhanced AC immunity in ground fault detection.

SUMMARY

Embodiments of the present invention provide improvements in ground fault detection in a central office terminal. More specifically, in one embodiment, a method for reducing the occurrence of false ground fault detections in a central office terminal is provided. The method includes generating a no-fault signal when no ground current is detected, delaying generation of a fault signal when ground current is detected at least for the duration of an expected pulse in AC induced signal, and when the ground current persists for a sufficient period, generating a signal indicating a fault condition.

BRIEF DESCRIPTION OF THE DRAWINGS

FIGS. 3A and 3B are timing diagrams illustrating one embodiment of a process for providing AC immunity to a ground fault detection circuit.

FIGS. 4A and 4B are timing diagrams illustrating one embodiment of a process for detecting a ground fault with a ground fault detector with increased AC immunity.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide enhanced AC immunity in ground fault detection circuits to avoid problems with AC induced signals on telecommunication lines.

Some embodiments use an AC immunity circuit that conditions the output of the ground fault detection circuit in a manner that stretches out AC pulses in the ground fault detection signal to reduce the chances of a false ground fault detection.

Figure 1:
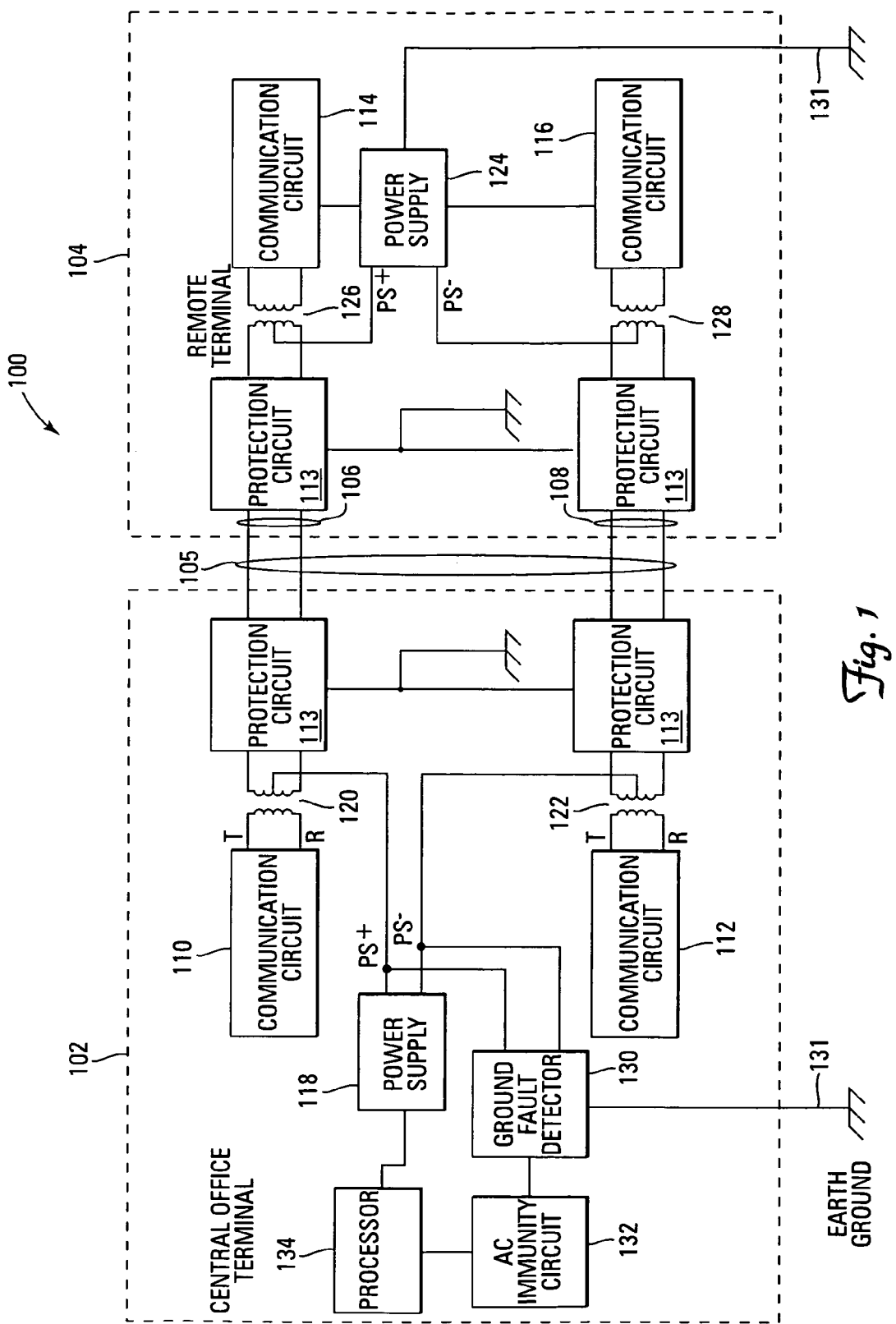
FIG. 1 is a block diagram of a telecommunications system with enhanced AC immunity for ground fault detection according to one embodiment of the present invention.

FIG. 1 is a block diagram of one embodiment of a telecommunications system 100 with enhanced AC immunity to ground fault detection. The embodiment of system 100 is a four wire digital subscriber line communication system the includes a central officer terminal 102 and a remote terminal 104 coupled together over a communication medium 105 comprising two twisted copper pairs 106 and 108. In other embodiments, the teachings of the present application with respect to AC immunity are applied to other systems that use copper wires exposed to potential electrical disturbances, e.g., single pair systems.

In this embodiment, the central office terminal 102 provides power to and communicates data with the remote terminal 104. The central office terminal 102 includes communication circuits 110 and 112 that communicate data with corresponding communication circuits 114 and 116, respectively, over twisted copper pairs 106 and 108. In one embodiment, these communication circuits communicate data using high bit rate digital subscriber line (HDSL), asymmetric digital subscriber line (ADSL), G.SHDSL, or any other appropriate xDSL or other communication protocol.

Central office terminal 102 also includes power supply 118 that provides power over communication medium 105 to power remote terminal 104. Power supply 118 includes two outputs PS+ and PS−. The output of power supply 118 is typically a negative voltage on the order of −190VDC. The power supply 118 injects the power signal on the communication medium through transformers 120 and 122 that are coupled to PS+ and PS−, respectively. The power is received in remote terminal 104 at power supply 124. Power supply 124 is coupled to communication medium 105 through transformers 126 and 128. Power supply 124 typically reduces the voltage level received from power supply 118 for use by the circuits of remote terminal 104, e.g., communication circuits 114 and 116.

Central office terminal 102 also includes circuitry that is designed to protect the central office terminal 102 from damage due to electrical surges caused by various natural phenomenon, e.g., lightning strikes. The circuitry 113 appears at each interface of the twisted copper pairs 106 and 108 and is connected to ground 131. Protection circuitry 113 activate as surge voltages rise above the trigger threshold of the protection devices used and conduct away large amounts of surge currents, thus reducing the surge voltages seen by the end terminal equipment 102 and 104. Further protection and personnel safety circuitry includes a ground fault detector 130, an AC immunity circuit 132 and a processor 134. The ground fault detector 130 is coupled to the power supply signals PS+ and PS− and is adapted to determine when a current to ground 131 exceeds a selected threshold. When such a condition is detected, the ground fault detector 130 produces a signal that indicates a ground fault condition has occurred. Unfortunately, the ground fault detector 130 may provide a false indication of a fault condition due to AC induced signals on the communication medium 105. Thus, the signal from ground fault detector 130 is conditioned to reduce the likelihood of a false indication of a ground fault condition.

This embodiment uses a combination of circuit elements to reduce the potential for false indications of a ground fault due to AC induced signals on communication lines 105. Central office terminal 102 includes, for example, a combination of software and hardware filtering along with circuitry that extends AC pulses in the output of ground fault detector 130. In one embodiment, the hardware filter comprises a capacitor built into the ground fault detector. An example of this type of hardware filter is shown and described below with respect to FIG. 2. Further, the software filtering is typically implemented in processor 134.

AC immunity circuit 132 implements the pulse extender functionality. For example, AC immunity circuit 132 receives the ground fault signal from ground fault detector 130. When AC current is present, periodic pulses corresponding to the various harmonics of the AC fundamental frequency occur in the signal from ground fault detector 130. The AC immunity circuit 132 stretches out the pulses for a period of time sufficient to allow the software filtering of processor 134 to prevent a false indication of a ground fault condition caused by the higher harmonic pulse rates which exceed the software filters sampling capability. In one embodiment, the AC immunity circuit 132 stretches out the portion of the AC signal that indicates no fault condition such that the output of ground fault detector 130 is conditioned to remain in a no fault state for a prolonged period.

Processor 134 over-samples the output of AC immunity circuit 132 periodically to determine if there is a ground fault in the communications system. Without AC immunity circuit 132 or a software filtering means, the processor 134 was prone to false detection of ground faults because it could sample the signal from the ground fault detector in a low state (active state) caused by the pulses from the AC induced signal. With some software filtering means, this problem was partially solved, e.g., at lower harmonic frequencies. However, due to the presence of higher harmonics in the AC induced signal, e.g., harmonics above 180 Hz (especially at 540 Hz and 900 Hz), the software filtering could not achieve the sampling rate to eliminate the problem. With the addition of AC immunity circuit 132, the effective sampling rate of the processor is increased beyond the harmonic frequencies of the AC induced signal, thereby improving the accuracy of the ground fault detection circuit.

Figure 2:
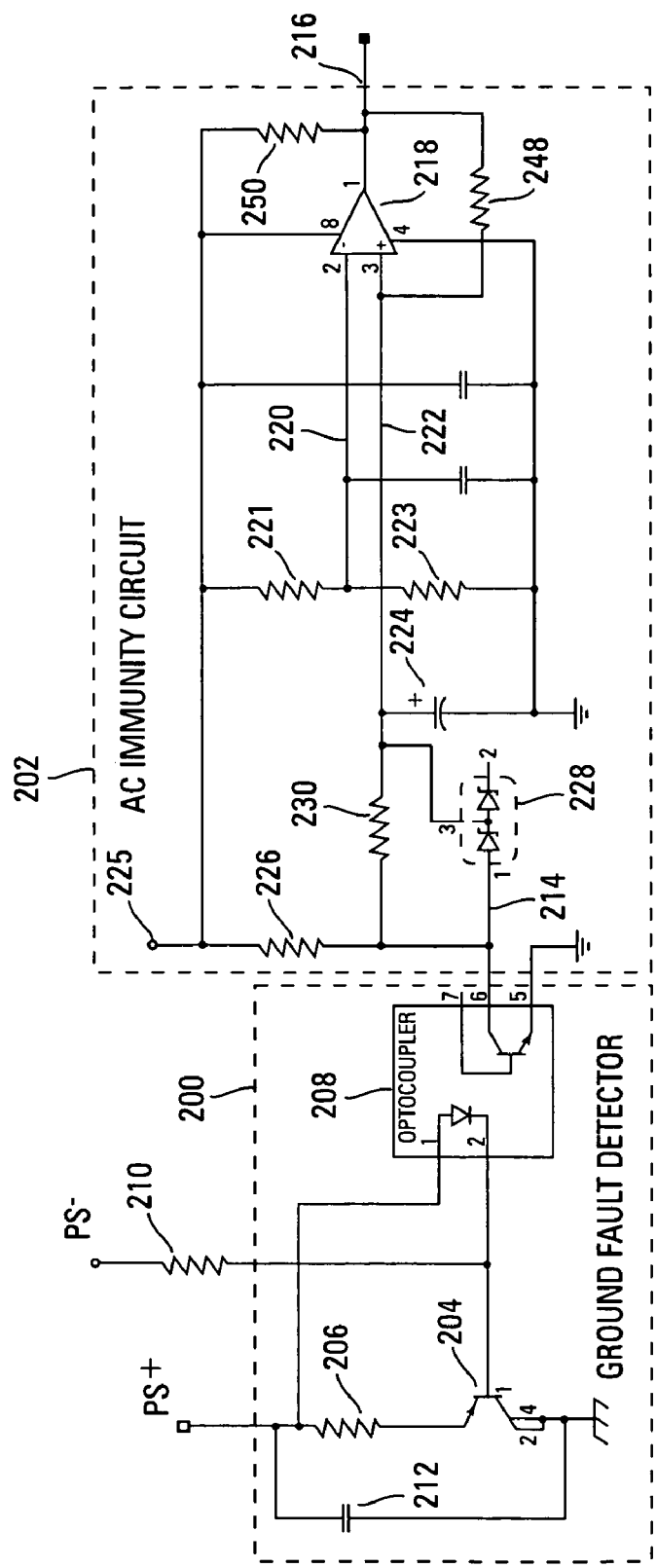
FIG. 2 is a block diagram of one embodiment of an AC immunity circuit according to one embodiment of the present invention.

FIG. 2 is a block diagram of one embodiment of a ground fault detector 200 and an AC immunity circuit 202 for use in a central office terminal, e.g., central office terminal 102 of FIG. 1. AC immunity circuit 202 conditions the output of ground fault detector 200 so as to reduce the effect of AC induced signals in the telecommunications system.

Ground fault detector 200 detects ground fault conditions. Ground fault detector 200 includes transistor 204 and resistor 206. Resistor 204 is coupled to the supply signal PS+. In most embodiments, the PS+ signal is referenced to ground such that all power signals in the system are below ground potential to prevent corrosion as is known in the art. Resistor 206 is also coupled to the emitter of transistor 204. The collector of transistor 204 is coupled to chassis ground, e.g., earth. The base of transistor 204 is coupled to the PS− signal through resistor 210. Ground fault conditions cause current to flow in resistor 206 and transistor 204. This current is used to indicate a ground fault condition when it rises above a selected level.

Ground fault detector 200 also includes an optocoupler 208 that is coupled to the base of transistor 204 and the PS+ signal. Optocoupler 208 is turned on when current above a selected level flows to earth through resistor 206 and transistor 204. When this condition is detected, the output of optocoupler 208 transitions to a low output voltage to indicate the fault condition.

When an AC signal is induced on the communication medium, e.g., communication medium 105 of FIG. 1, this signal causes an AC current to flow in resistor 206 and transistor 204. Thus, on one-half of the AC cycle of the induced signal, optocoupler 208 is turned on and on the other half the cycle optocoupler 208 is turned off. If left unmitigated or filtered, this AC signal can lead to false indications of a ground fault in ground fault detector 200.

Ground fault detector 200 includes a hardware filter that is used to at least partially address this problem. The hardware filter, in this embodiment, comprises capacitor 212 coupled across resistor 206 and transistor 204. Unfortunately, the value of capacitor 212 cannot be made large enough to fully remove the AC components because such a capacitor would provide a dangerous low impedance path to ground and prevent proper electrical protection circuit function. Further, such a capacitor would be prohibitively large and expensive due to the low frequencies involved with AC signals. Capacitor 212 can be made of sufficient size to provide sufficient filtering of only the highest frequency harmonic components (above 1020 Hz) of the AC induced signal. The lower and middle frequency components (60 Hz through 900 Hz) are addressed through pulse extension and software filtering.

Pulse extension is accomplished in AC immunity circuit 202. AC immunity circuit 202 is coupled to the output of ground fault detector circuit at node 214. AC immunity circuit 202 conditions this signal at node 214 and provides an output at node 216.

In one embodiment of AC immunity circuit 202 includes a comparator 218 that compares a reference voltage at input 220 with a signal at input 222. The reference voltage is established by a voltage divider comprising resistors 221 and 223 and power supply 225. The signal at input 222 is the signal from node 214 with pulses caused by induced AC.

AC immunity circuit 202 extends the pulses in the signal at node 214 using two signal paths with different time constants. The two signal paths control the charging and discharging of capacitor 224. The first signal path charges capacitor 224. The first signal path includes resistor 226 and diode 228. Resistor 226 is coupled between node 214 and a power supply 225, e.g., a 3.3 V supply. Diode 228 is coupled between node 214 and node 222. Capacitor 224 is coupled between node 222 and ground.

The second signal path controls the discharging of capacitor 224. The second signal path includes resistor 230 coupled between nodes 214 and 222. Resistor 230 has a resistance value that is substantially greater than resistor 226. This difference in resistance values controls the difference in time constants between the two paths. In one embodiment, resistor 226 is 10 KΩ and resistor 230 is 75 KΩ.

The operation of the circuit of FIG. 2 is described with respect to the timing diagrams of FIGS. 3A, 3B, 4A, and 4B. FIGS. 3A and 3B illustrate the conditioning effect of AC immunity circuit 202 on the output of ground fault detector 200 in the presence of an AC induced signal. Further, FIGS. 4A and 4B illustrate the manner in which AC immunity circuit 202 processes a signal without an AC induced component.

FIG. 3A illustrates a signal at node 214 when an AC signal is induced on the communication medium, e.g., communication medium 105 of FIG. 1, by a co-located power line. At time T1, the ground fault detector signal 214 is at a high voltage level corresponding to the time where the induced AC current opposes the DC leakage current, resulting in a net current below the selected level of the ground fault detector. At time T2, the signal output by the ground fault detection circuit transitions to a low voltage which corresponds to the point where the induced AC current becomes additive to the DC leakage currents and exceeds the selected level of ground fault detector 200. In the absence of AC induction, a continuous low voltage state of this signal would indicate that a DC ground fault has been detected.

During this cycle (between T2 and T3), the voltage at node 214 is grounded and the capacitor 224 is enabled to discharge through resistor 230, e.g., through the second signal path. Because the time constant of the second signal path is much longer than the time constant of the first signal path, the voltage at node 222 does not change significantly before it is recharged as described below.

The first signal path of AC immunity circuit 202 maintains the no fault state during the other half of the AC cycle of the signal at node 214. At time T3, the signal shown in FIG. 3A returns to a high voltage level. This turns on the diode 228 and allows the capacitor 224 to be charged from voltage source 225 through resistor 226 and diode 228. Because the resistor 226 is selected with a lower resistance value, the capacitor is quickly charged up to a level sufficient to maintain the indication of no fault condition.

The AC immunity circuit 202 produces the conditioned ground fault detection signal based on the voltage across capacitor 224 appearing, at node 222 which is the input to comparator 218. A sample of comparator 218 output at node 216 of AC immunity circuit 202 is shown in FIG. 3B. As can be seen in FIG. 3B, the output voltage at node 216 remains constant at a level indicating no fault despite the AC induced signal on the communication lines. The voltage at node 222 is maintained above the reference voltage set at node 220 by the resistor divider. Thus, comparator 218 produces the high voltage output at node 216. This indicates to the processor that there is no fault despite the AC induced signal.

When the DC leakage current increases above the selected level, a true DC ground fault conditions occurs. Increased DC leakage current decreases the high times and increases the low times in signal 3A, allowing the second signal path of AC immunity circuit 202 to discharge capacitor 224. The resulting voltage on node 222 falls below the selected level on node 220 forcing comparator 218 output 216 to go low, AC immunity circuit 202 produces a slightly delayed signal indicating the ground fault condition as shown in the timing diagrams of FIGS. 4A and 4B. This delay is caused by the time constant of the second path in AC immunity circuit 202 that compensates for the AC induced signal. In this example, a ground fault occurs at time T5. At time T5, the signal from the ground fault detector transitions from a high (no fault) condition to a low (fault) condition. At this time, diode 228 is turned off and capacitor 224 is slowly discharged through resistor 230. When the capacitor voltage drops below the reference voltage at node 220, the comparator 218 trips and changes the output at node 216 to a low voltage level indicating a ground fault at T6.

It is noted that the described embodiments have used a low voltage level to indicate a fault condition. It is understood that in other embodiments, a fault condition is indicated by a high voltage signal. Further, capacitors 242 and 244 are standard bypass noise capacitors. In one embodiment, resistor 250 is included as a pull-up resistor because comparator 218 is open collector. Further, optional resistor 248 can be included to add hysteresis to comparator 218, but, it is not necessary to improve noise performance. Further, with the use of AC immunity circuit 202, the processor, in some embodiments, does not implement a software filter on the output of AC immunity circuit 202.

In another embodiment, AC immunity circuit 202 extends any AC pulse that is present in the output of the ground fault detector 200 through the use of a retriggerable monostable timer to decrease the chances of a false positive indication of a ground fault. The pulse is extended at least for the duration of the low voltage cycle of the AC induced signal. In one embodiment, the pulse is stretched past the edge of the next sampling period. This effectively raises the bandwidth of the software filter.

What is claimed is:

1. A method for reducing the occurrence of false ground fault detections in a central office terminal, the method comprising:
   generating a no-fault signal when no ground current is detected;
   delaying generation of a fault signal when ground current is detected at least for the duration of an expected pulse in AC induced signal; and
   when the ground current persists for a sufficient period, generating a signal indicating a fault condition.

2. The method of claim 1, wherein generating a no-fault signal when no ground current is detected comprises generating a logical high signal.

3. The method of claim 1, wherein delaying generation of a fault signal comprises delaying generation of the fault signal while discharging a capacitor through a resistor in a signal path with a higher resistance value that a resistor in a signal path used to charge the capacitor.

4. A circuit for providing AC immunity to a ground fault detector in a central office terminal, the circuit comprising:
   a comparator having first and second inputs and providing an output;
   a reference voltage coupled to one input of the comparator;
   a capacitor, coupled to the other input of the comparator;
   a first path for charging the capacitor to a first state when the ground fault detector indicates no ground fault; and
   a second path for discharging the capacitor at a slower rate than the charging in the first path in response to a signal level corresponding to a fault detection;
   wherein the second path providing immunity to AC signals that alternate between levels that correspond to fault and no-fault conditions.

5. The circuit of claim 4, wherein the first path includes a first resistor in series with a diode.

6. The circuit of claim 5, wherein the second path includes a second resistor with a resistance value that is substantially larger than the first resistor.

7. The circuit of claim 5, wherein the first resistor is coupled between a voltage source and the output of the ground fault detector.

8. The circuit of claim 7, wherein the second resistor is coupled between the capacitor and the output of the ground fault detector.

9. The circuit of claim 7, wherein the reference voltage comprises a resistor divider coupled between the voltage source and ground.

10. A method for enhancing the output of a ground fault detection circuit, the method comprising:
    detecting a signal from the ground fault detection circuit indicating a condition with no ground fault;
    rapidly charging a capacitor to a level that indicates the detected condition;
    comparing the capacitor voltage with a reference voltage;
    producing an enhanced output for the ground fault detection signal indicating the no ground fault condition;
    receiving a subsequent signal from the ground fault detector indicating a possible ground fault condition; and
    slowly discharging the capacitor in response to the possible ground fault condition at a rate such that the risk of the capacitor discharging to a level to change the enhanced output to indicate a ground fault is reduced when the subsequent signal is an AC induced signal.

11. An AC immunity circuit for a ground fault detection circuit of a central office terminal, the AC immunity circuit comprising:
    a comparator;
    a reference voltage that differentiates between a ground fault and a normal operating condition; and
    a pulse extender circuit, adapted to receive a signal from the ground fault detection circuit, the pulse extender adapted to extend the duration of an AC induced signal at a level indicative of a no-fault condition over a time of at least one pulse in the AC induced signal.

12. The AC immunity circuit of claim 11, wherein the reference voltage comprises the output of a voltage divider circuit with the voltage set at a level that produces a ground fault detection when the ground current exceeds a selected level.

13. The AC immunity circuit of claim 11, wherein the pulse extender circuit comprises an RC circuit with a time constant that leaves the ground fault detection signal substantially unchanged during a portion of the AC induced signal that would otherwise cause a ground fault detection.

14. An AC immunity circuit for a ground fault detection circuit of a central office terminal, the AC immunity circuit comprising:
    means for generating a signal indicating a potential ground fault current;
    means for generating a reference voltage;
    means for comparing the signal indicating a potential ground fault current with the reference voltage; and
    means for extending pulses in the signal indicating a potential ground fault current to reduce the impact of AC induced currents on the ground fault detection.

15. A method for reducing the occurrence of false ground fault detections in a central office terminal, the method comprising:
    generating a no-fault signal when no ground current is detected in said central office terminal;
    delaying generation of a fault signal when ground current is detected at least for the duration of an expected pulse in AC induced signal; and
    when the ground current persists for a sufficient period, generating a signal indicating a fault condition in said central office terminal.

* * * * *